United States Patent [19]
Rautenberg et al.

[11] 4,201,607
[45] May 6, 1980

[54] MANUFACTURE OF OPTICAL FIBER CABLES

[75] Inventors: Peter Rautenberg, Düsseldorf; Hartmut Hildenbrand; Daljit-Singh Parmar, both of Essen, all of Fed. Rep. of Germany

[73] Assignee: AEG - Telefunken Kabelwerke AG, Rheydt, Monchen-Gladbach, Fed. Rep. of Germany

[21] Appl. No.: 850,832

[22] Filed: Nov. 10, 1977

[30] Foreign Application Priority Data
Nov. 11, 1976 [DE] Fed. Rep. of Germany ....... 2651725

[51] Int. Cl.² .......................... B65B 11/00; G02B 5/14
[52] U.S. Cl. ......................... 156/70; 29/434; 29/505; 83/54; 83/178; 156/148; 156/203; 156/259; 156/383; 156/517; 350/96.23
[58] Field of Search ............ 156/148, 259, 303.1, 156/52, 294, 54, 293, 70, 383, 215, 218, 203, 517, 514; 174/68 C, 136, 97; 53/567; 29/624, 434, 516, 517, 505; 83/54, 178, 179, 184, 185, 745; 350/96.23, 96.24; 57/58.49, 58.52, 64

[56] References Cited
U.S. PATENT DOCUMENTS

| 2,195,046 | 3/1940 | Best .................................. 156/294 |
| 3,251,161 | 5/1966 | Stirn ................................. 174/136 |
| 3,415,288 | 12/1968 | Marshack ...................... 156/218 |

FOREIGN PATENT DOCUMENTS

| 620971 | 9/1961 | Belgium ................................ 174/136 |
| 1178202 | 9/1964 | Fed. Rep. of Germany ............. 83/178 |
| 2528991 | 2/1976 | Fed. Rep. of Germany ........ 350/96.23 |
| 1462160 | 1/1977 | United Kingdom . |
| 1487464 | 9/1977 | United Kingdom ................. 350/96.23 |

Primary Examiner—Michael W. Ball
Attorney, Agent, or Firm—Spencer & Kaye

[57] ABSTRACT

In order to produce an optical cable core composed of a plurality of optical cable elements stranded together, each element is produced by longitudinally slitting a stable tube, inserting at least one optical fiber into the tube through the slit, and causing the slit to close behind the fiber so that the fiber lies loosely in the tube, and the resulting elements are then stranded together to form the core.

5 Claims, 5 Drawing Figures

MANUFACTURE OF OPTICAL FIBER CABLES

BACKGROUND OF THE INVENTION

The present invention relates to the manufacture of an optical cable of the type having a core made up of one or a plurality of stranded optical cable elements, each such element being composed of a stable sheath and at least one optical fiber lying loosely therein.

Reference herein to optical fibers is intended to mean fibers of a material suitable for the transmission of light in the infrared, visible, or ultraviolet range or in part of these ranges of the electromagnetic spectrum. Such optical fibers may be encased in a protective sheath in order to protect their surfaces and serve mainly for the transmission of information.

Optical fibers are mechanically, or physically, very sensitive. For that reason they are arranged in protective sheaths either individually or in bundles, for further processing, installation and assembly. Herein, such an arrangement of one or several fibers within a sheath is referred to as an optical cable element, a plurality of which elements are stranded together to form the core of an optical cable. During the stranding operation, the cable elements are subjected to substantial bending and tensile stresses. Similarly, during later installation and assembly of the cable, there occur bending and tensile stresses which act on the light conductor arrangements. This may damage the optical fibers contained in the light conductor arrangements or may reduce their transmission quality.

It is known to protect optical fibers against bending and tensile stresses occurring during the stranding of light conductor arrangements by arranging them loosely in tube-like sheaths which absorb such mechanical stresses. The optical fibers are freely movable within the tube-like sheaths. Such a light conductor arrangement is disclosed, for example, in German Offenlegungsschrift [Laid-open Application]No. 25 56 861.

According to this disclosure, the tube-like sheath is extruded in a spaced arrangement around the optical fibers. The temperature required for this process presents a danger of damage to the plastic sheath around the optical fibers.

A drawback of this known light conductor arrangement is that, after completion of the manufacturing process, it must be wound on drums, and during such a winding process the optical fibers do not remain in the center of the tube but rest against the inner wall of the tube at the side closest to the center of the drum.

When this arrangement of light conductors is then straightened out again for stranding, the fibers are shorter than the tube and are therefore stretched, which often leads to breaks in the fibers.

SUMMARY OF THE INVENTION

It is an object of the present invention to produce an optical cable of the above-described type in which the optical fibers disposed in the cable elements are dependably protected against mechanical bending or tensile stresses and against breakage.

A further object of the invention is to retain the advantages of the loose sheathing of the optical fibers.

Another object of the invention is to minimize fabrication costs and to protect the optical fibers from damage caused by mechanical or thermal influences.

These and other objects are accomplished according to the present invention by slitting the tubes forming the optical cable elements of a cable open longitudinally, introducing an optical fiber or fibers into each such tube through the slit, and reclosing the tubes, or permitting them to close, and then stranding a number of tubes together, as by twisting, to form a cable core.

According to a preferred embodiment of the method of the invention, the tubes forming the optical cable elements of a cable are longitudinally slitted in the stranding, or twisting, machine, the optical fibers are inserted into the tubes through these slits, the tubes are closed again, and the tubes are then twisted together to form the cable core immediately thereafter without being wound onto drums. The tubes may, however, also be wound on drums immediately after insertion of the optical fibers, to be stranded later in a separate stage.

In order to increase the tensile strength of the optical cable elements, the slits in the tubes may be covered at the outside by a longitudinally applied nonstretchable cable tape.

Apparatus according to the invention for practicing the above-described method is designed as a cutting device including a blade and a spacer element, the blade is attached to be stationary at the spacer element, engages axially into the longitudinally moved tube and slits it open from the inside toward the outside, while the spacer element engages in the slit while being stationary with respect to the tube so as to open the tube in the form of a trough, and the spacer element is provided with guide means for insertion of the optical fibers into the opened tube. In the preferred embodiment of apparatus according to the invention, a cutting device is provided for each tube to be stranded, the cutting device being disposed in the stranding machine between the associated tube drum and the stranding nipple.

In the region of the blade, guide rollers are provided to guide the tube and a counterroller is provided to press the tube toward the cutting edge of the blade. In addition, contact rollers are provided to dependably guide the cut edges of the tube around both sides of the spacer element, the contact rollers pressing the bottom of the trough formed by the cut-open tube against the spacer element.

The method according to the invention has the advantage that the production of the cable elements and their stranding into a cable can be effected in succession in one process step. For this reason, the optical fibers come to lie in the cable elements, while remaining free of tensile and bending stresses.

Since the optical cable elements are not wound onto drums after their production, an additional process step is eliminated and the danger to the optical fibers which would otherwise exist during unwinding of the cable elements from the drums is avoided. The practice of the method according to the invention is technically very simple. There is no thermal danger to the optical fibers during manufacture of the cable elements.

It is of particular advantage to utilize the resiliency inherent in the open tube, as a result of which the tube tends to close automatically once the optical fibers have been inserted. If it is desired to make the light conductor arrangements more resistant to tensile stresses, the slit is advisably closed with a longitudinally extending adhesive tape which contains a stretch-preventing reinforcement.

DESCRIPTION OF THE PREFERRED EMBODIMENTS

Figure 1:
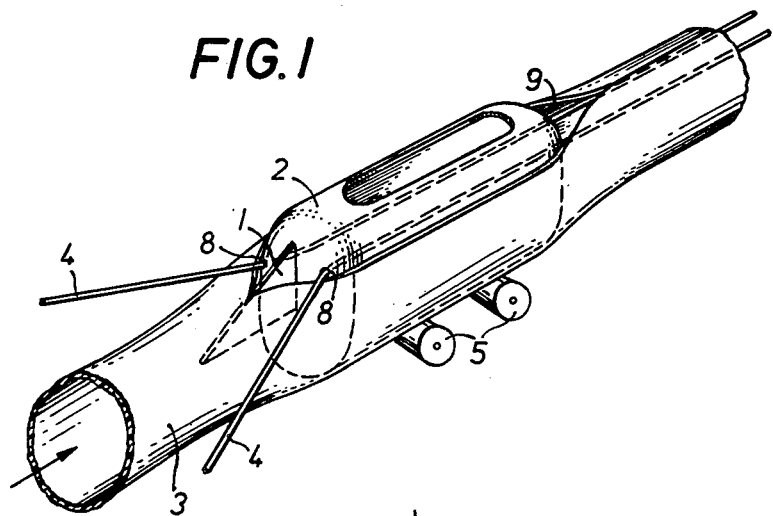
FIG. 1 is a perspective view of a preferred embodiment of apparatus for practicing the method of the invention.
Figure 2:
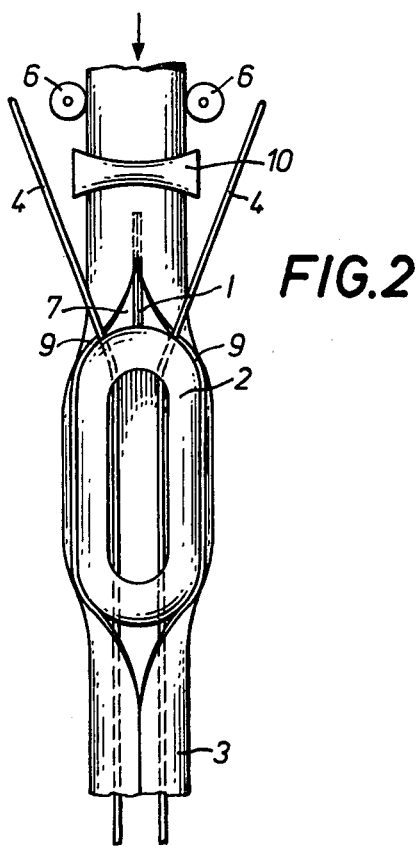
FIG. 2 is a plan view of the apparatus of FIG. 1.

As shown in FIGS. 1 and 2, a tube 3 which is to form the sheath for optical fibers is conveyed in the direction of the arrow appearing in each figure. A blade 1 is disposed at the frontal face of a spacer member 2 which is stationary and with respect to which the tube advances in its direction of movement. The tip of blade 1 is located within the tube and its cutting edge extends from the tip across the tube wall so that the blade slits the tube open in the longitudinal direction, from the inside toward the outside. Spacer element 2 is arranged in such a manner that the cut edges 9 of the slit-open tube move around spacer element 2, along either side thereof.

The cut-open tube forms, in the region of element 2, a trough whose bottom is pressed to the underside of spacer element 2 by underlying rollers 5. Any other device which assures dependable guidance of the slit-open tube may be provided instead of rollers 5.

The spacer element 2 is provided with guides 8 in the form of openings by means of which optical fibers 4 are inserted into the opened tube. Behind the spacer element the tube closes automatically due to the resiliency inherent in the material of which it is consituted. If a more stretch resistant arrangement of the finished light conductor arrangement is desired, the seam may be closed longitudinally by means of a nonstretchable adhesive tape.

As shown in FIG. 2, the tube is pressed against the cutting edge of blade 1 by a guide 10, which can either be fixed or rotatable about an axis perpendicular to the length of tube 3 and parallel to the plane of FIG. 2, so that it is cut open in a dependable manner.

Figure 3:
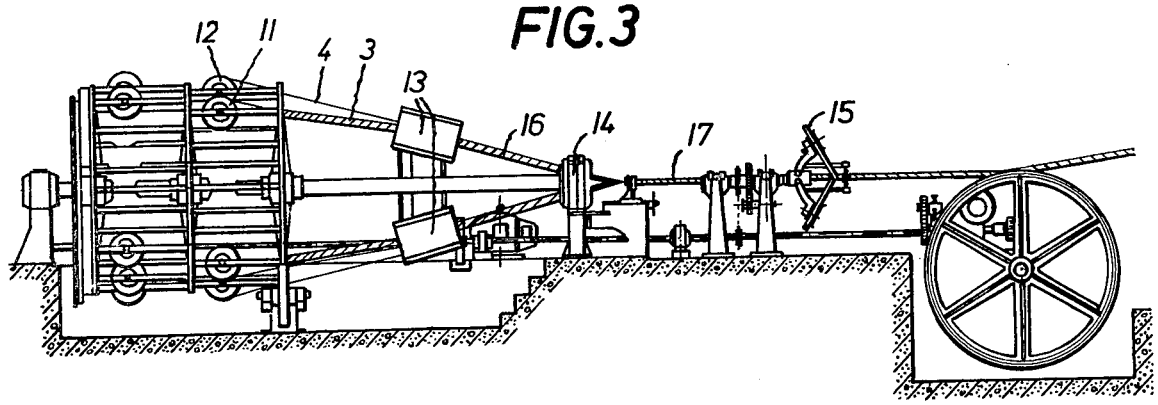
FIG. 3 is a view of a stranding machine illustrating formation of optical fiber elements and stranding together of a plurality of such elements.

According to a particularly preferred embodiment of the invention, the above-described arrangement is made a part of a stranding machine, one embodiment of which is illustrated in FIG. 3. The stranding machine is provided with one such device for each cable element to be stranded, each such device being disposed between an associated tube drum and the stranding nipple. The cable elements are thus stranded according to the present invention immediately after their manufacture. No intermediate winding on drums, with attendant danger to the optical fibers, is required.

Figure 4:
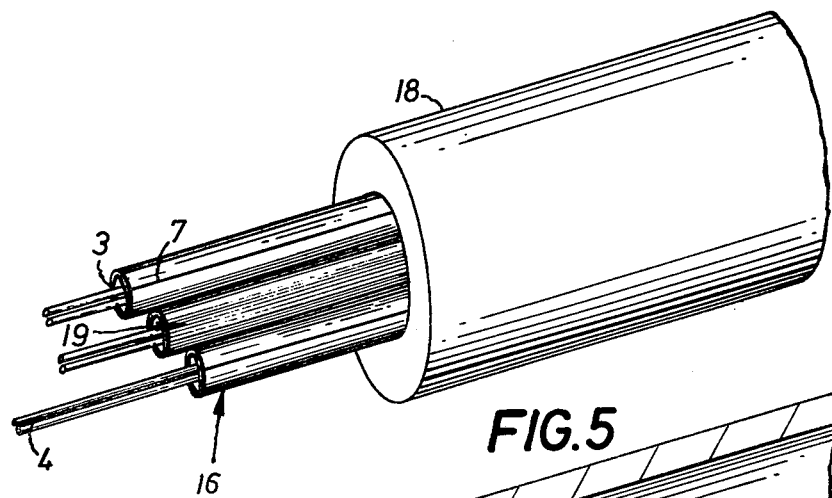
FIG. 4 is a perspective view of the optical fiber cable.
Figure 5:
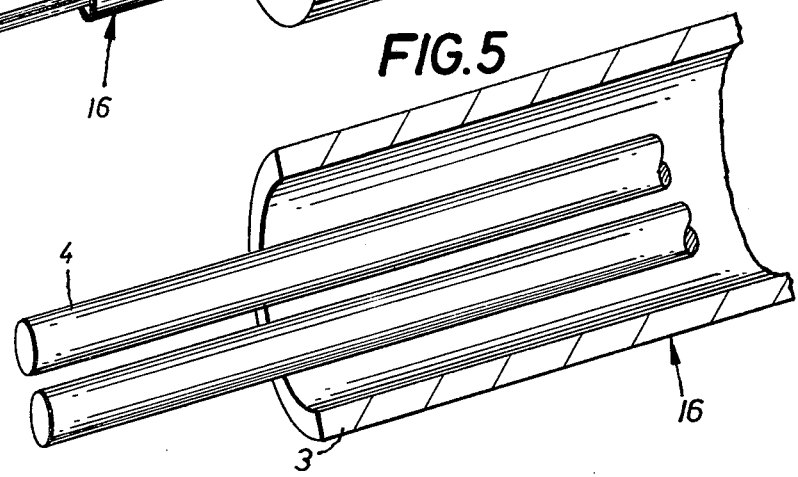
FIG. 5 is a longitudinal section of one of the optical fiber elements.

FIG. 3 shows a universal stranding machine whereby the cutting device 13 as shown in FIG. 1 and FIG. 2 is installed in the section between the associated drums section, carrying tube drums 11 and fiber drums 12, and the stranding nipple 14. The optical cable elements 16 whose longitudinal section is shown in FIG. 5, are taped by a taping device 15 to form an optical cable core 17. FIG. 4 shows a view of the finished cable. The slit 7 in each tube 3 may be closed by applying a longitudinally extending adhesive tape 19 which contains a stretch preventing reinforcement like glass fiber laminate.

Tube 3 is made out of a thermoplastic like polyethylene or polypropylene. The tube dimensions depend upon the number of optical fibers to be inserted in it. For example, for two optical fibers each of outer diameter of 0.75–0.85 mm, a tube of 2.8–3.0 mm internal diameter with a wall thickness 0.5–0.6 mm proved successful.

It will be understood that the above description of the present invention is susceptible to various modifications, changes and adaptations, and the same are intended to be comprehended within the meaning and range of equivalents of the appended claims.

What is claimed is:

1. A method for producing an optical cable core composed of a plurality of optical cable elements, each element including a stable tube and at least one optical fiber lying loosely in the tube, said method comprising: slitting each tube open longitudinally and simultaneously inserting the at least one optical fiber into each tube through the slit formed therein; causing the slit in each tube to close behind the inserted fiber; and stranding the tubes containing the fibers together to form the core; wherein said step of stranding is performed in a stranding machine directly after said step of causing the slit in each tube to close without winding the tubes on drums, and said step of slitting is performed in the stranding machine.

2. A method as defined in claim 1 further comprising covering the slit in each tube, at the outer surface of the tube, by externally applying a nonstretchable adhesive tape to each tube along the length thereof.

3. Apparatus for producing an optical cable core composed of a plurality of optical elements, each element including a stable tube and at least one optical fiber lying loosely in the tube, comprising a plurality of cutting devices, one for each said optical element and each cutting device being disposed downstream of a respective tube supply and being composed of a spacer member and a cutting blade fixed to the spacer member and presenting a cutting edge projecting from one end of the spacer member, each said cutting device being disposed in the path of longitudinal advance of such a tube for causing the cutting edge of said blade to traverse the tube wall and slit the tube while said spacer member engages in the resulting slit and separates the edges of the slit to give the tube the form of a trough, said spacer member being provided with guide means for guiding at least one optical fiber into the tube in the region where it has the form of a trough, and means for advancing said tubes with said at least one optical fiber therein past said cutting devices to allow said slit tubes to close and for advancing said elements to a stranding nipple to strand said elements into a cable core.

4. Apparatus as defined in claim 3 further comprising first guide means disposed in the region of said blade for guiding the tube toward said blade, and second guide means disposed in the region of said blade for pressing the tube against the cutting edge of said blade.

5. Apparatus as defined in claim 4 further comprising means disposed for pressing the bottom of the trough formed by the open tube against said spacer member so as to permit safe guidance of the edges of the slit formed in the tube around the sides of said spacer member.

* * * * *